Dec. 5, 1950  J. B. WALKER  2,532,684
LENS ADJUSTING MECHANISM FOR CAMERAS
Filed June 10, 1948

INVENTOR
JOSEPH B. WALKER
BY Westall & Westall
ATTORNEYS

Patented Dec. 5, 1950

2,532,684

UNITED STATES PATENT OFFICE 2,532,684

LENS ADJUSTING MECHANISM FOR CAMERAS

Joseph B. Walker, Hollywood, Calif.

Application June 10, 1948, Serial No. 32,160

5 Claims. (Cl. 88—57)

This invention relates to lens adjusting mechanism for cameras, and more specifically contemplates an attachment for motion picture and television cameras embodying a multiple lens system, elements of which are synchronously but variably adjustable relative to the focal plane during operation of the camera.

As is well known, different magnification of a photographic subject may be obtained in successive exposures for still pictures or for successive motion picture sequences, by substituting different lens systems which are preadjusted to combine the desired degree of magnification with proper focusing adjustment for each picture or sequence. For obvious reasons the substitution of the lens systems is not possible where it is desirable, as in motion picture work, to vary the magnification of the photographic subject in a single sequence. In television, where it is not possible to edit the recorded images before broadcast, two television cameras, equipped with different lens systems, are commonly employed alternately for effecting the transmission of successive sequences of different magnification, thus avoiding interruption of the broadcast incident to changing the lens system on a single camera.

In my Patent No. 1,898,471, granted February 21, 1933, and in my co-pending application, Serial No. 791,897, filed December 15, 1947, now Patent No. 2,506,947, dated May 9, 1950, I have disclosed mechanical means for adjusting elements of a lens system to obtain the essential magnification of the photographic subject while maintaining the subject in focus, during the filming of a single sequence, the apparatus having application to television cameras, whereby a single scene may be continuously televised with variable magnification by a single camera. In accordance with the teachings of said application and patent, separate lens elements of a dual lens assembly are moved synchronously relative to the focal plane to form an image of the variable size required, and coincidentally relative to one another to assure continuous critical focusing adjustment. This result is achieved by the utility of a cam variably shifting one of the lens elements, and in my co-pending application above alluded to an adjustable cam is provided to render the apparatus adaptable to accommodate lens systems of different focal length. However, it is difficult to provide mechanically a single cam which is capable of a sufficient range of adjustment for all lens combinations commonly used, and accordingly provision is made for the substitution of the cam by others of different contour.

It is a principal object of the present invention to provide a dual lens system adapted for utility with photographic or television cameras embodying a multiple lens system wherein separate lens elements are movable synchronously relative to the focal plane but at different speeds and to different degrees, in combination with means for effecting coaxial relative adjustment of elements of one of the lenses to enable preliminary focal adjustment of the system for any specific distance.

Another object is the provision of a variable field lens system comprising a positive lens and a negative lens assembly adapted to be moved progressively relative to one another and to the focal plane in accordance with a pre-established ratio, selective focusing of the lens system for different depths of field being accomplished by separating and contracting the elements of the negative lens assembly.

Another object is to provide a lens system comprising two lens assemblies movable axially in response to a single control relative to the focal plane of the camera with which the system is employed to coincidentally vary the magnification of the subject and maintain the latter in focus, one of the lens assemblies comprising a pair of negative lenses movable relative to one another for pre-adjustment of the lens system to different depths of field.

More specifically, it is an object hereof to provide, in optical alignment, a primary lens assembly movable in response to actuation of a manual control to vary the magnification of the subject and a negative lens assembly movable coincidentally with the positive lens in response to motivation by cam mechanism actuated by the same control, operable to compensate for focusing maladjustment of the primary lens, the elements of the negative lens being separable and contractible independently of the movement of the secondary lens system by the cam mechanism to effect a preliminary focusing adjustment of the lens system, whereby the same cam mechanism may be utilized to effectively control the movement of the secondary lens assembly regardless of the distance between the subject and the camera.

The above and numerous other objects and corresponding advantages, such for example as the adaptability of the lens assembly to any common type of motion picture or television camera, absolute variable control of the magnification and corresponding focusing adjustment of the lens system throughout the exposure of any sequence, elimination of the necessity of substituting lenses or cams in order to assure critical focusing when successively photographing subjects at different distances from the camera, and facility of preadjustment of the secondary lens system, will be best and more fully understood from the following description of a typical form and application of the invention, throughout which description reference is had to the accompanying drawings, in which:

Figure 1:
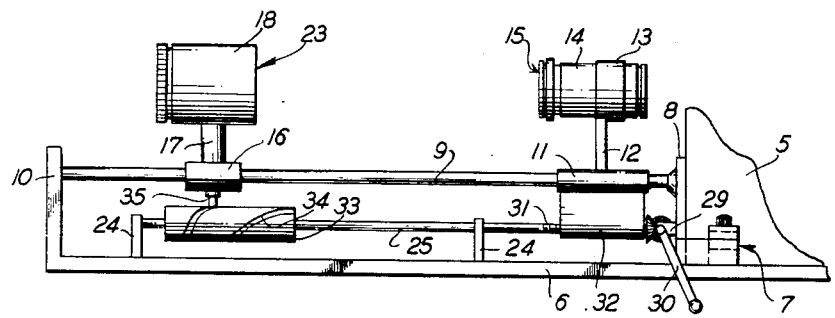
Fig. 1 is a broken elevation of a camera with a lens system embodying my invention in operative relationship therewith.
Figures 2, 3:
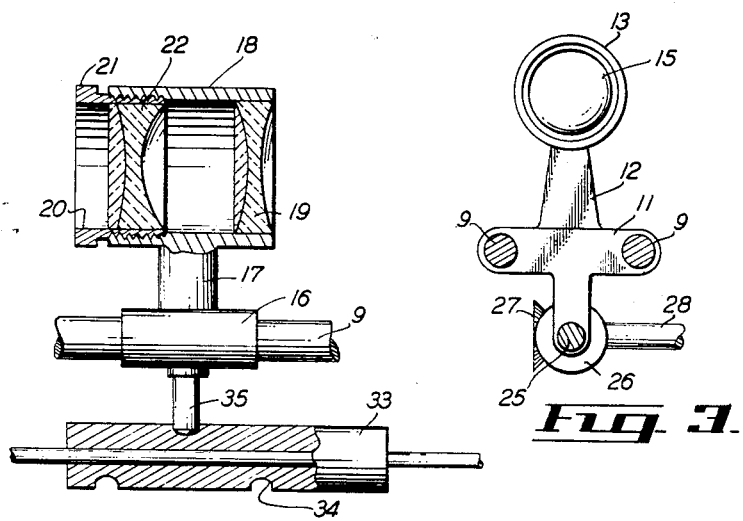
Fig. 2 is an enlarged vertical section through the secondary lens and mechanism by which the latter is adjusted.
Fig. 3 is a transverse sectional view through the supporting means for the lens system, illustrating in elevation the primary lens assembly.
Figure 4:
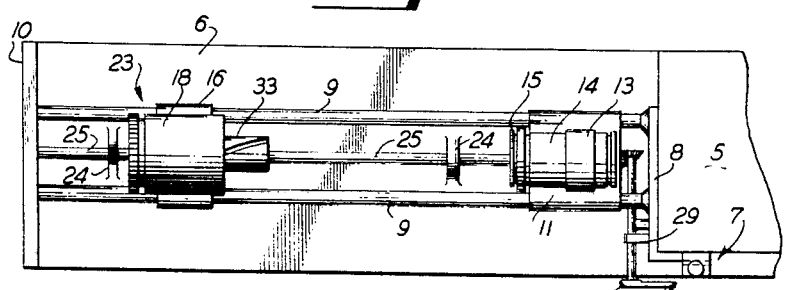
Fig. 4 is a plan view of the camera attachment in operative relationship, with the camera shown partially broken away.

In the drawings, wherein like numerals indicate similar parts throughout the several views, 5 designates generally the case of a camera which is illustrative of either a motion picture or television camera. The attachment embodying my invention comprises an elongated flat base 6 releasably secured by suitable means generally indicated at 7 to the camera case 5 so as to extend in a normally horizontal plane forward of the camera and below the optical axis of the latter. Integral with the base 6 is an upstanding plate 8 flanking the forward wall of the camera case 5 for the support of a pair of spaced parallel guide rods 9 above and parallel to the base 6. The outer ends of rods 9 are mounted in a plate 10 integral with the corresponding end of the base 6.

Slidable on the rods 9 is a lens support 11 having a standard 12 projecting upwardly from the middle thereof for the support of a sleeve 13 in which is mounted a circular housing 14 for a composite primary positive lens assembly 15 so as to optically align the latter with the aperture (not shown) of the camera. Thus the positive lens assembly may be focused in a conventional manner by shifting the same upon the rods 9 toward and away from the focal plane of the camera.

Forward of the positive lens assembly, a secondary-lens support 16 is carried slidably on the rods 9. Mounted upon the support 16, equidistant between the rods, is a post 17 upon the upper end of which a circular casing 18 is disposed in coaxial alignment with the primary lens 15. Secured by suitable means within one end of the casing 18 is an achromatic negative lens 19. The bore of the opposite forward end of the lens casing 18 is threaded to receive a sleeve 20. One end of sleeve 20 projects from the casing 18 and is provided with an externally knurled rim 21 to facilitate manual rotation of the sleeve. Suitably mounted within the sleeve 20 is a second achromatic negative lens 22 adapted to be shifted axially toward and away from the composite negative lens 19 housed in the opposite end of the casing 18 incident to manual rotative adjustment of the sleeve, for a purpose hereinafter more in detail described.

Mounted upon the base 6 at a point forward of the secondary negative lens unit 23, comprising negative lens 19 and 22, and intermediate the primary and secondary lenses, respectively, are a pair of supports 24 for a pair of bearings (not shown) in which a drive shaft 25 is journalled. The shaft 25 extends parallel to and directly below the common axes of the lens assemblies 15 and 23. The rearward end of the shaft 25 terminates adjacent the plate 8, and has keyed thereto a bevel gear 26 adapted to mesh with a complementary bevel gear 27 carried by a transverse actuating shaft 28 journalled in bearings 29 supported by the plate 8. The actuating shaft 28 extends laterally of the base 6, and is equipped with a crank 30 by which the same may be turned in either direction so as to correspondingly rotate the drive shaft 25. Immediately forward of the bevel gear 26, the shaft 25 is screw threaded to form a worm 31 adapted for coaction with a complementarily threaded follower 32 depending from the primary lens support 11 whereby rotation of the shaft 25 in response to the turning of the crank 30 is effective to shift the primary lens 15 axially on the guide rods 9. Encircling the drive shaft 25 adjacent the forward bearing 24 for the latter is a cam 33, circular in cross section, and formed with a helical cam groove 34 in its periphery. A cam follower 35 depends from the underside of the secondary lens support 16 for engagement within the groove 34, whereby rotation of the cam 33 with the drive shaft 25 in response to actuation of the crank 30 moves the secondary lens assembly 23 forward or back, depending upon the direction of rotation of the crank.

After that the entire lens system is initially focused upon the subject, the movement of the primary lens system 15, in response to the urge of the worm 31 actuated by the crank 30, correspondingly varies the magnification of the subject and the size of the image transmitted to the focal plane. The contour of the cam groove 34 is pre-formed to compel movement of the secondary lens assembly 23 in a direction and at a speed, proportionate to the velocity of movement of the primary lens 15, to compensate for focusing maladjustment of the entire lens system resulting from the movement of the primary lens so as to maintain the subject in focus throughout the sequence.

While the ratio of the velocity of movement of the primary lens system 15, with respect to the focal plane, relative to the difference in velocities of movement between the primary and secondary lens systems 15 and 23, may thus be predetermined and established by the contour of the cam 33 for any particular distance between the camera and photographic subject, variations in the focal distance which necessitate a corresponding variation in the initial spacing of the primary and secondary lens assemblies disturb this ratio of relative movement, and accordingly any preadjustment of the lens systems for any purpose which departs from the initial established distance between the lens assemblies 15 and 23 requires the use of a cam having a groove 34 of different contour incident to maintaining critical focus during movement of the primary lens assembly 15.

This objectionable requirement for substitution of cams of different contour when photographing subjects located at different distances from the camera is obviated in the present invention by the provision of the dual secondary lens assembly 23, comprising the negative lenses 19 and 22 coaxially adjustable with respect to one another so as to obtain an initial critical focus of a subject located at any distance from the camera without disturbing the relationship between the primary and secondary lens assemblies 15 and 23 or of both with respect to the focal plane upon which the contour of the cam 33 depends. This result is achieved by the manual rotation of the knurled rim 21 of the sleeve 20 so as to shift the foremost negative lens 22 forward or back until an initial critical focus is obtained, respective primary and secondary lenses 15 and 23 remaining in precisely the same spaced relationship regardless of the distance of the subject from the camera. Thereafter, and during operation of the camera, the image recorded may be enlarged or reduced in size during exposure of a single sequence by proper rotative manipulation of the crank 30, critical focusing being assured throughout this movement of the primary lens 15 by the corresponding and coincidental movement of the entire secondary lens unit 23 in response to the urge of the cam 33. Being actuated by the same shaft 25, the operations of the worm 31 and cam 33 are permanently synchronized, and accordingly accuracy of progressive focusing adjustment depends solely upon the contour of the cam which may be determined by those of skill in the art.

It will be appreciated that the embodiment depicted in the drawings and described above is only illustrative of my invention, and that the novel features thereof may be incorporated in many forms differing, for example, in size, design, shape, number and proportion of the parts, that simple negative lenses may be substituted for the achromatic negative lenses 19 and 22 shown, and that either the negative or positive lens may have positive or negative elements combined in their construction, the terms "negative lens" or "positive lens," as employed herein referring to the over-all optical characteristics of the combined lens elements of which the respective units are composed.

What I claim and desire to secure by Letters Patent is:

1. In a camera lens system, a lens assembly, means to move said lens assembly axially for varying the magnification of the subject, a secondary lens assembly, and focusing means for moving said secondary lens assembly axially coincident with movement of said first-named lens assembly and in optical alignment with the latter to maintain the focus of said lens system during movement of the first-named lens assembly, said secondary lens assembly comprising two negative lenses axially movable relative to one another to compensate for variations in distance between the subject and lens system.

2. In a camera lens system, a lens assembly, means to move said lens assembly axially for varying the magnification of the subject, a secondary lens assembly, focusing means for moving in an opposite direction said secondary lens assembly axially coincident with the movement of said first-named lens assembly and in optical alignment with the latter to maintain the focus of said lens system during movement of the first-named lens assembly, a single control for actuating said first-named means and said focusing means, said secondary lens assembly comprising two negative lenses axially movable relative to one another to compensate for variation in distance between the subject and the lens system.

3. In a camera lens assembly, a primary lens assembly, means to shift said primary lens assembly axially, a secondary lens assembly, focusing means for moving said secondary lens assembly coaxially with said primary lens assembly but at a different velocity to maintain the focus of said system during movement of said primary lens assembly, a single control for synchronously actuating said first-named means and said focusing means, said secondary lens assembly comprising two negative lenses axially movable relative to one another to compensate for variation in object distance, and a separate rotary mechanism for shifting said negative lenses axially relative to one another, operable independently of the movement of said lens assemblies with respect to one another.

4. In a camera lens system, a primary lens, a secondary lens assembly axially aligned with said primary lens, means for moving both of said lenses axially in unison, said last-named means including a cam varying in contour for correspondingly changing the relative speed of movement of said lenses throughout the range of movement thereof, said secondary lens assembly comprising a pair of negative lenses movable axially relative to one another to compensate for variations in depth of field, a pair of lens casings for said negative lens respectively, said casings being threadedly related for varying the spacing of said negative lenses in response to relative rotation between said casings so as to compensate for variation in object distance.

5. In a camera lens system, a lens assembly, means to move said lens assembly axially for varying the magnification of the subject, a secondary lens assembly, focusing means for moving in an opposite direction said secondary lens assembly axially coincident with the movement of said first-named lens assembly and in optical alignment with the latter to maintain the focus of said lens system during movement of the first-named lens assembly, a single control for actuating said first-named means and said focusing means, said secondary lens assembly comprising two lenses axially movable relative to one another to compensate for variation in distance between the subject and the lens system, and rotary means to effect relative axial adjustment of said last-named lenses.

JOSEPH B. WALKER.

REFERENCES CITED

The following references are of record in the file of this patent:

UNITED STATES PATENTS

| Number | Name | Date |
|---|---|---|
| 1,174,547 | Clason | Mar. 7, 1916 |
| 1,755,105 | Douglass | Apr. 15, 1930 |
| 1,790,232 | Flora | Jan. 27, 1931 |
| 1,802,099 | Wolfe | Apr. 21, 1931 |
| 1,898,471 | Walker | Feb. 21, 1933 |
| 1,980,147 | Wolfe | Nov. 6, 1934 |
| 2,159,394 | Mellor | May 23, 1939 |
| 2,165,341 | Capstaff et al. | July 11, 1939 |